No. 842,313. PATENTED JAN. 29, 1907.
H. W. HARRISON.
MIRROR SUPPORT.
APPLICATION FILED JUNE 28, 1906.
2 SHEETS—SHEET 1.
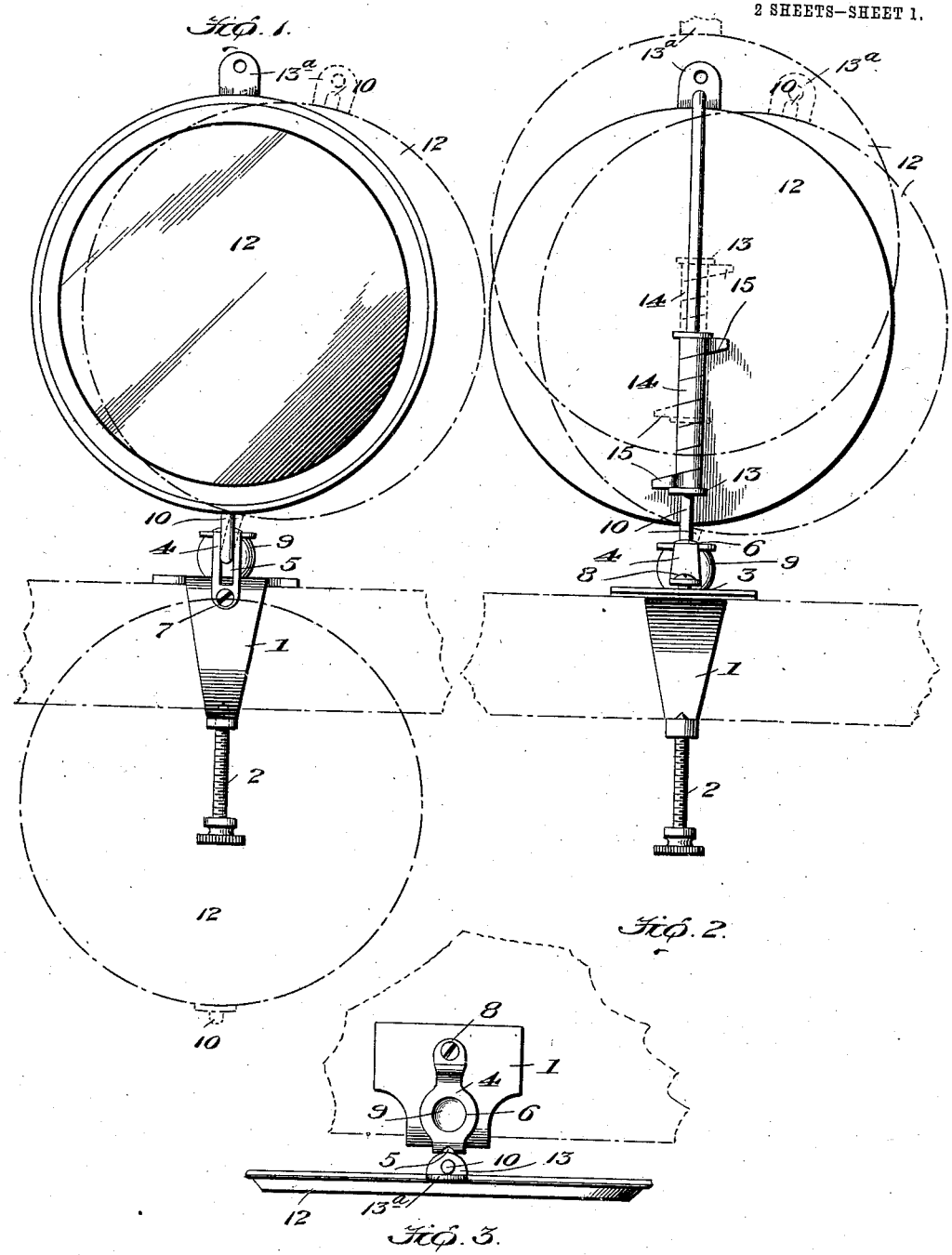

No. 842,313. PATENTED JAN. 29, 1907.
H. W. HARRISON.
MIRROR SUPPORT.
APPLICATION FILED JUNE 28, 1906.
2 SHEETS—SHEET 2.
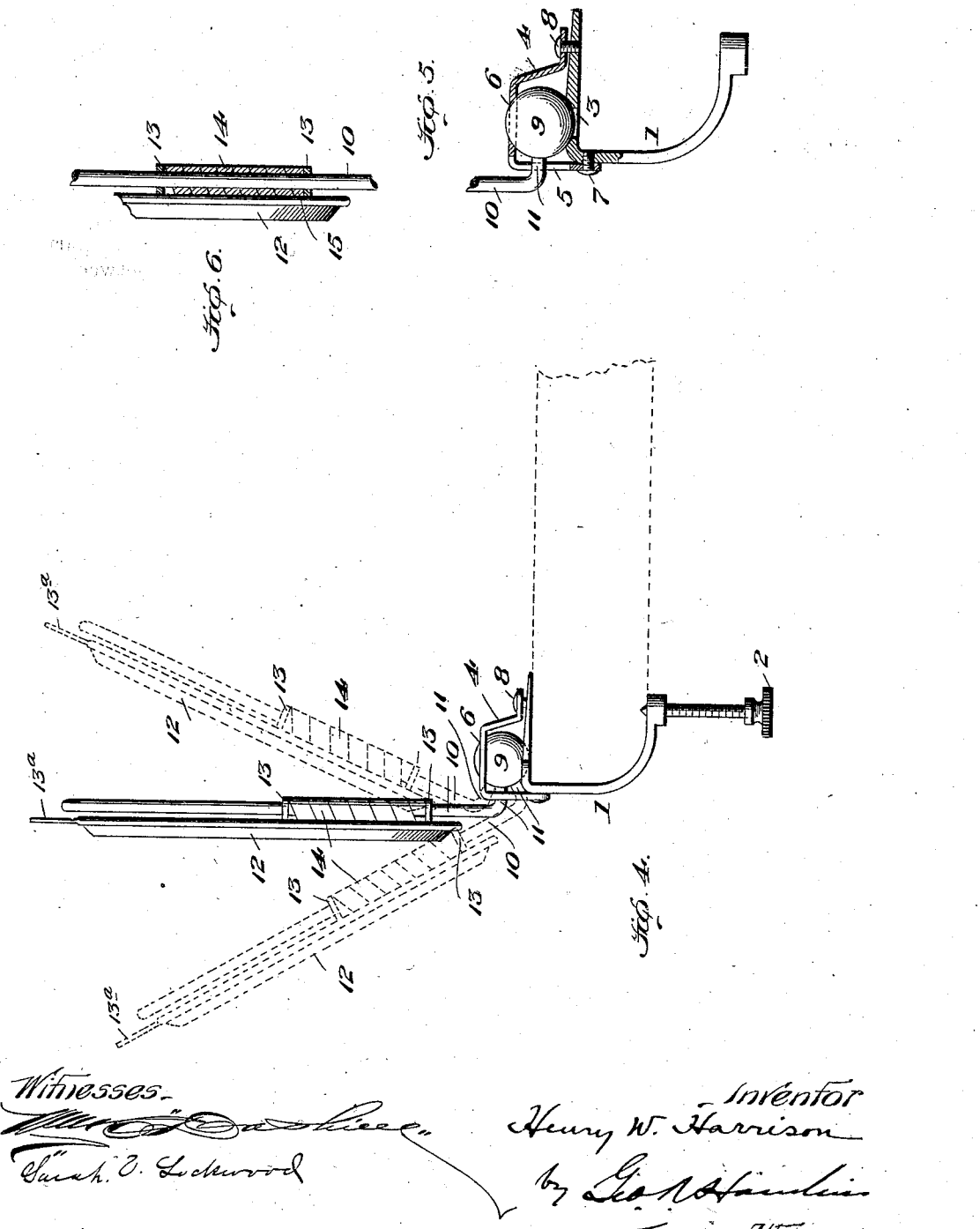
Witnesses
Inventor
Henry W. Harrison

UNITED STATES PATENT OFFICE.

HENRY W. HARRISON, OF CLINTON, IOWA.

MIRROR-SUPPORT.

No. 842,313.  Specification of Letters Patent.  Patented Jan. 29, 1907.

Application filed June 28, 1906. Serial No. 323,885.

*To all whom it may concern:*

Be it known that I, HENRY W. HARRISON, a citizen of the United States, residing at Clinton, county of Clinton, and State of Iowa, have invented certain new and useful Improvements in Mirror-Supports, of which the following is a specification.

My invention relates to mirror-supports.

The present invention has for its object the provision of a simple, inexpensive, and durable support for mirrors, especially those intended to be portable and used when shaving, which will be adapted for quick and easy attachment to a table, window sill, sash, or other object, and will be capable of immediate adjustment in all directions to suit the convenience of the user, and will be collapsible into small compass, so it may be readily carried about.

Having the foregoing object in view the invention contemplates the provision of a bracket or clamp which may be attached to the table, window sill, or sash, &c., a universal joint of peculiar and novel construction, having means for insuring the retention of the parts at all times wherever adjusted, and a slidably and rotatably mounted mirror, as set forth fully hereinafter.

In the accompanying drawings, Figure 1 is a front view; Fig. 2, a rear view; Fig. 3, a top view; Fig. 4, a side view; Fig. 5, an enlarged detail view of the universal joint; and Fig. 6, an enlarged detail view of the connection between the mirror and its standard.

In the various figures dotted lines represent views of the various adjustments of which the parts are susceptible.

The numeral 1 designates a metal clamp having a clamping-screw 2, whereby the clamp may be attached to a table, window sill, or sash, &c. In the top of the clamp there is provided a concavity or opening 3, which forms a part of the seat for the ball to be described later. A bracket 4, having a vertical slot 5 and a ball-seat 6, is secured to the clamp 1 by screws 7 and 8.

The numeral 9 designates a ball which is seated in the seats 3 and 6. A mirror-standard 10 is secured to the ball 9 by a neck 11, which extends at right angles to the standard and passes through the slot 5.

A mirror 12, having eyes 13, slidably and rotatably connected to the standard 10, is held at the desired point of adjustment rotatably or where positioned lengthwise of the standard by a flat strip of resilient material 14, coiled about the standard 10 between the eyes 13 and having the ends 15 to bear against the mirror-back and abut the eyes aforesaid. This coiled strip 14 snugly embraces the standard, so that it is adapted to sustain the mirror wherever it may be adjusted lengthwise of said standard, and it also holds the mirror where adjusted rotarily in relation to said standard.

The proportioning of the parts is such that a slight space exists between the bracket 4 and the clamp 1 where the screw 8 connects them, so that if any wear of the parts causes the ball to become loose the screw 8 can be tightened to hold the ball wherever it may be turned.

The mirror can be raised or lowered on its standard or turned on said standard, as desired. The slot 5 permits a certain amount of forward and backward movement of the mirror-standard to position the mirror at the desired inclination, according to whether the device is secured at a point below or above the eye of the user, and said slot permits a complete rotation of the mirror-standard and mirror in a vertical plane.

An eye $13^a$ is provided on the mirror, so it may be hung up, if desired.

The entire device is very light and can be collapsed or folded into very small space, so that it may be conveniently boxed or carried in the pocket.

The novel ball-and-socket joint permits all adjustments which may be required and obviates the necessity of employing the numerous and clumsy joints used in other mirrors to enable various adjustments to be had.

In view of the foregoing capacities for adjustment the mirror can be brought to any desired angle or position, according to the requirements of the user.

Having thus described my invention, what I claim as new, and desire to secure by Letters Patent, is—

1. In a mirror-support, the combination with a mirror-standard, of a mirror having eyes which are slidable and rotatable on said mirror-standard, and a friction-clamp on said mirror-standard comprising a spring coiled around and frictionally engaging the standard between said eyes which permits the mirror to be rotated or shifted lengthwise of the mirror-standard and is adapted to hold said mirror where positioned.

2. In a mirror-support, the combination with a mirror-standard, of a mirror having eyes which are slidable and rotatable on said standard, and a friction-clamp comprising a resilient strip coiled around and frictionally embracing the mirror-standard between the eyes and provided with projecting ends to bear against the mirror, said friction-clamp holding the mirror where adjusted.

3. In a mirror-support, the combination with a base-plate having a ball-seat, of a bracket having a part substantially parallel to the base-plate and provided with a ball-seat and another part provided with a slot which lies substantially at right angles to the base-plate, a mirror-support having a neck bent at an angle to its length and passing freely through the slot aforesaid, and a ball on the end of the neck which is frictionally held in said seats.

4. In a mirror-support, the combination with a clamp and a clamping-screw for securing the clamp to an object, said clamp having a ball-seat, of a bracket having a ball-seat and provided with a slot, means securing the bracket to the clamp, a mirror support or standard having a neck bent at an angle to its length and passing through the slot aforesaid, and a ball secured to said neck and frictionally held in said seats.

In testimony whereof I hereunto affix my signature in presence of two witnesses.

HENRY W. HARRISON.

Witnesses:
 E. A. SCHNELL,
 H. D. PHELPS.